(12) United States Patent
Tagawa (10) Patent No.: US 9,756,208 B2
(45) Date of Patent: Sep. 5, 2017

(54) IMAGE READING DEVICE AND IMAGE FORMING APPARATUS THEREWITH

(71) Applicant: KYOCERA Document Solutions Inc., Osaka (JP)

(72) Inventor: Hirotoshi Tagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/222,411

(22) Filed: Jul. 28, 2016

(65) Prior Publication Data

US 2017/0064127 A1   Mar. 2, 2017

(30) Foreign Application Priority Data

Aug. 24, 2015   (JP) .................................. 2015-165028

(51) Int. Cl.
*H04N 1/04*   (2006.01)
*H04N 1/12*   (2006.01)
(Continued)

(52) U.S. Cl.
CPC ....... *H04N 1/0464* (2013.01); *H04N 1/00408* (2013.01); *H04N 1/00602* (2013.01);
(Continued)

(58) Field of Classification Search
CPC ... H04N 2201/0094; H04N 2201/0081; H04N 1/00588; H04N 1/0057; H04N 1/00689; H04N 1/00774; H04N 1/4076; H04N 2201/044; H04N 1/00034; H04N 1/00082; H04N 1/4097; H04N 1/00013; H04N 1/00092

USPC ........ 358/474, 498, 406, 497, 1.9, 296, 463, 358/486, 504; 399/69, 53, 55, 21, 27, 399/270, 334

See application file for complete search history.

(56) References Cited

U.S. PATENT DOCUMENTS 6,307,621 B1 * 10/2001 Endo .................... B65H 3/0615
346/134
6,323,933 B1 * 11/2001 Anzai .................... H04N 1/203
355/23

(Continued)

FOREIGN PATENT DOCUMENTS

JP   11-271274 A   10/1999
JP   2011-130233 A   6/2011

*Primary Examiner* — Negussie Worku
(74) *Attorney, Agent, or Firm* — Stein IP, LLC (57) ABSTRACT

An image reading device includes a contact glass, a document transport device, a first reading module, a second reading module, a opposite roller, and roller holders. The opposite roller transports a document while keeping it in close contact with an image reading surface of the second reading module arranged inside the document transport device. The roller holders rotatably support the opposite roller, and on their faces facing the second reading module, a pair of patterns for detection is provided to detect the inclination of the opposite roller. The patterns for detection are each formed to be increasingly wide toward a first end side in the axial direction upstream from an intersection in a central part thereof in the document transport direction, and increasingly wide toward a second end side opposite from the first end side downward from the intersection in the document transport direction.

17 Claims, 7 Drawing Sheets

(51) Int. Cl.
*H04N 1/00* (2006.01)
*H04N 1/193* (2006.01)

(52) U.S. Cl.
CPC ............. *H04N 1/121* (2013.01); *H04N 1/193* (2013.01); *H04N 2201/0081* (2013.01); *H04N 2201/0094* (2013.01)

(56) References Cited

U.S. PATENT DOCUMENTS

| | | | | |
|---|---|---|---|---|
| 7,199,332 | B2* | 4/2007 | Kagawa | G03G 15/2053 219/216 |
| 7,382,506 | B2* | 6/2008 | Awai | B65H 3/44 358/296 |
| 7,525,692 | B2* | 4/2009 | Nakaya | H04N 1/4076 358/461 |
| 8,447,198 | B2* | 5/2013 | Fujita | G03G 15/50 399/302 |
| 9,247,079 | B2* | 1/2016 | Yamamoto | H04N 1/00127 |
| 2007/0176350 | A1* | 8/2007 | Terada | B41J 11/425 271/10.11 |
| 2009/0169280 | A1* | 7/2009 | Tanahashi | B41J 3/60 399/397 |
| 2010/0059926 | A1* | 3/2010 | Terada | B41J 13/0018 271/10.09 |
| 2011/0293348 | A1* | 12/2011 | Horade | B41J 11/42 400/582 |
| 2013/0241141 | A1* | 9/2013 | Karikusa | B65H 9/00 271/227 |
| 2014/0145397 | A1* | 5/2014 | Aoki | G03G 15/65 271/228 |
| 2016/0159598 | A1* | 6/2016 | Yamane | B65H 9/002 271/227 |
| 2016/0274507 | A1* | 9/2016 | Kurita | G03G 15/2028 |
| 2017/0057265 | A1* | 3/2017 | Tsukada | B41J 29/393 |

* cited by examiner

IMAGE READING DEVICE AND IMAGE FORMING APPARATUS THEREWITH

INCORPORATION BY REFERENCE

This application is based upon and claims the benefit of priority from the corresponding Japanese Patent Application No. 2015-165028 filed on Aug. 24, 2015, the entire contents of which are incorporated herein by reference.

BACKGROUND

The present disclosure relates to an image reading device that is incorporated in digital copiers, image scanners, etc. and that scans and reads a document, and to an image forming apparatus incorporating such an image reading device. More particularly, the present disclosure relates to an image reading device adopting a sheet through system in which an image is read while a document is being transported.

Some conventional image reading devices incorporated in multifunction peripherals and the like employing an electrophotographic process are provided with a document transport device (automatic document feeder) of a type that transports, for reading, a sheet-form document one sheet after another to a document placement stage, where the document is read, and then discharges the document from the document placement stage. In such an image reading device, two ways of reading can be performed, namely, a sheet through system and a document stationary system. In the sheet through system, with a document presser closed, a document is read while being automatically transported by a document transport device. In the document stationary system, a document is read while an optical system (scanning means) is moved, with a document presser opened and closed each time the document is read to permit one sheet after another of the document to be placed on a document placement stage (contact glass). In the former sheet through system, reading operation of a document is performed with the optical system inside an image reading device held at a predetermined image reading position without moving for scanning. On the other hand, in the latter document stationary system, reading operation is performed with the optical system moving for scanning.

Reading methods adopted in such an image reading device include a CIS (contact image sensor) sensor method, which uses a photoelectric conversion element called a CMOS (complementary metal-oxide-semiconductor) sensor, and a CCD (charge-coupled device) sensor method, which uses a charge-coupled device called a CCD sensor. The CIS sensor method does not require a mirror, which is required in the CCD sensor method; this advantageously helps make a scanner unit incorporating the CIS sensor thinner, and thus helps reduce its cost owing to the simple structure. On the other hand, the CIS sensor has a very small depth of field as compared with the CCD sensor; this inconveniently makes it difficult to read uniformly a book document and a document with an uneven surface.

In recent years, the mainstream of the above-described sheet through system has been a simultaneous two-side reading system in which the obverse and reverse sides of a Mo-sided document are read simultaneously by use of different reading modules in one document transport operation by a document transport device. The reverse-side reading module is fixed inside the document transport device; it reads the image of a document at a reading position while the document is transported by a transport roller arranged opposite the reading module.

As a reverse-side reading module, a CIS sensor having a small depth of field is typically used. Thus, the transport roller arranged opposite the reading module is required to transport a document while keeping it in close contact with a reading surface (contact glass) of the reading module, and is thus arranged such that the vertex of the circumferential surface of the transport roller (the point where the circumferential surface of the transport roller and the reading surface make contact with each other as seen from the axial direction of the transport roller) coincides with the reading position of the reading module.

Here, when the vertex of the circumferential surface of the transport roller deviates from the reading position, the document is transported in a state displaced from the reading surface of the reading module; this may inconveniently cause image defects as result from the document image being out of focus. Thus, an image reading device is known which is provided with a position adjustment means for adjusting the position of a contact image sensor with respect to a white platen roller (shading roller).

As a method for detecting the inclination of a document transport device with respect to an image reading portion, an image reading device is known which detects the inclination of a document transport means as a result of a scanning means reading two check patterns formed on a bottom face of the document transport device while remaining at rest at a position facing the bottom face of the document transport device across a contact glass. The two check patterns are each so formed, with respect to the transport direction, as to have an intersection in a central part thereof, be increasingly wide toward a first end side of the bottom face in the axial direction upstream from the intersection, and be increasingly wide toward a second end side which is opposite from the first end side downward from the intersection. The two check patterns are arranged in line symmetry on opposite outer sides in the direction perpendicular to an image reading region.

SUMMARY

According to one aspect of the present disclosure, an image reading device includes a contact glass, a document transport device, a first reading module, a second reading module, a opposite roller, and roller holders. The contact glass is fixed to the top face of a scanner frame, and is divided into a manual placement document glass and an automatic read glass. The document transport device is openable/closable with respect to the contact glass in an up-down direction, and transports a document over the top face of the automatic read glass. The first reading module is arranged under the contact glass so as to be reciprocatable in the sub-scanning direction. The first reading module is capable of reading an image on the obverse side of a document placed on the manual placement document glass while moving in the sub-scanning direction and capable of reading an image on the obverse side of a document transported over the top face of the automatic read glass while remaining at rest at a reading position facing the automatic read glass. The second reading module is arranged inside the document transport device. The second reading module is capable of reading an image on the reverse side of a document transported over the top face of the automatic read glass. The opposite roller transports a document while keeping it in close contact with an image reading position of the second reading module. The roller holders rotatably support the opposite roller On faces of the roller holders facing the second reading module, a pair of patterns for detection is provided, inside a readable region of the second reading module, but outside a reading region of a document image, on opposite end parts of the opposite roller in the axial direction thereof perpendicular to the document transport direction. The patterns for detection are each formed so as to have an intersection in a central part thereof with respect to the document transport direction, be increasingly wide toward a first end side in the axial direction upstream from the intersection with respect to the document transport direction, and be increasingly wide toward a second end side which is opposite from the first end side downward from the intersection with respect to the document transport direction. The second reading module reads the patterns for detection to detect the inclination of the opposite roller.

Further features and advantages of the present disclosure will become apparent from the description of embodiments given below.

DETAILED DESCRIPTION

Hereinafter, embodiments of the present disclosure will be described with reference to the accompanying drawings.

Figure 1:
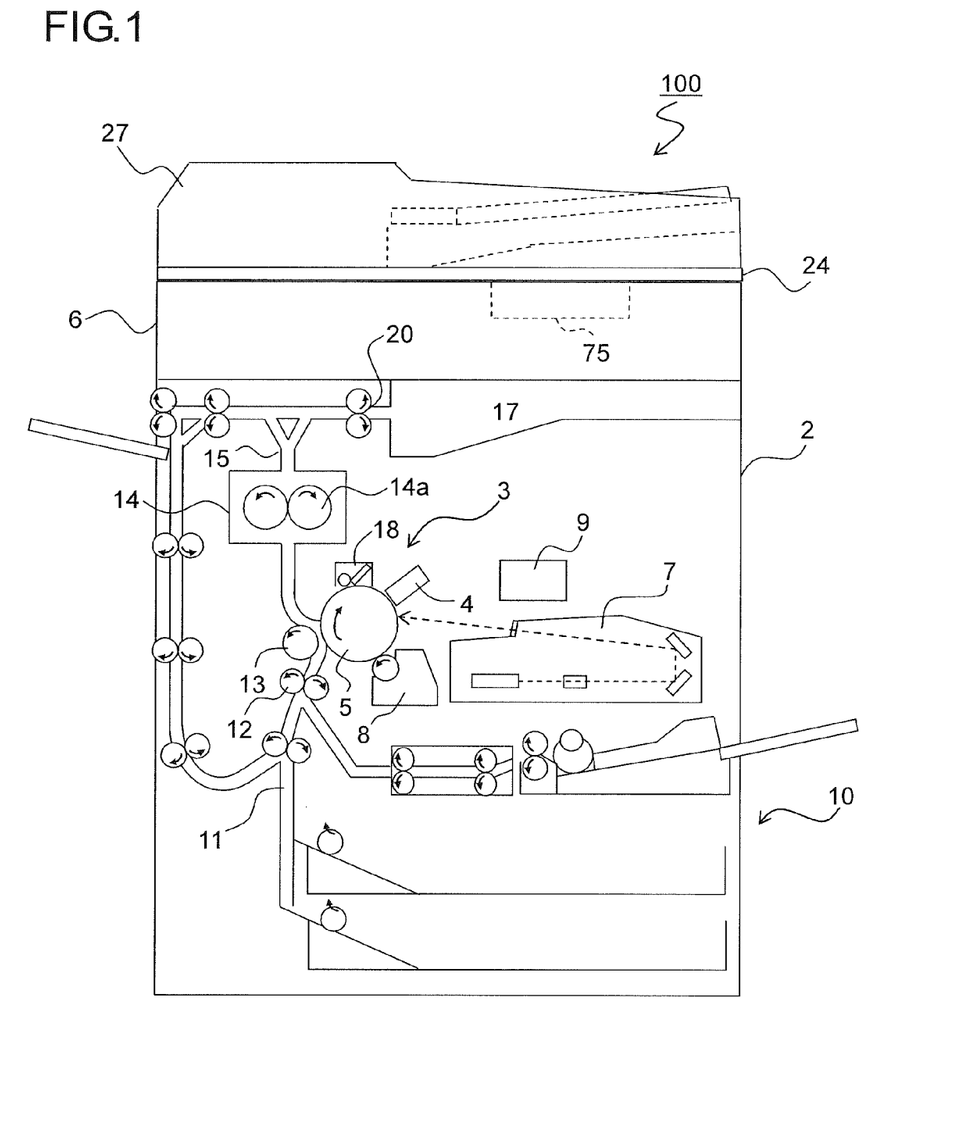
FIG. 1 is a side sectional view showing an overall construction of an image forming apparatus 100 incorporating an image reading device 6 according to one embodiment of the present disclosure.

FIG. 1 is a diagram showing an outline of a construction of an image forming apparatus 100 incorporating an image reading device 6 according to one embodiment of the present disclosure. In the image forming apparatus 100 shown in FIG. 1 (here a digital multifunction peripheral is taken as an example), a copy operation proceeds as follows. In the image reading device 6, which will be described later, document image data is read and is converted into an image signal. On the other hand, in an image forming portion 3 inside a multifunction peripheral main body 2, a photosensitive drum 5 that rotates in direction A in FIG. 1 is electrostatically charged uniformly by a charging unit 4, and an electrostatic latent image is formed on the photosensitive drum 5 by a laser beam from an exposure unit (such as a laser scanner unit) 7 based on the document image data read in the image reading device 6. Then, developer (hereinafter referred to as toner) is attached to the electrostatic latent image by a developing unit 8, and thereby a toner image is formed. Toner is fed to the developing unit 8 from a toner container 9.

Toward the photosensitive drum 5 having the toner image formed on it as described above, a sheet is transported from a sheet feeding mechanism 10 via a sheet transport passage 11 and a registration roller pair 12 to the image forming portion 3. When the transported sheet passes through a nip between the photosensitive drum 5 and a transfer roller 13 (image transfer portion), the toner image on the surface of the photosensitive drum 5 is transferred to the sheet. Then, the sheet to which the toner image has been transferred is separated from the photosensitive drum 5, and is transported to a fixing portion 14, which has a fixing roller pair 14a, so that the toner image is fixed there. The sheet having passed through the fixing portion 14 is discharged by a discharge roller pair 20 into an intra-body sheet discharge portion 17.

In an upper part of the multifunction peripheral main body 2, the image reading device 6 is arranged. Over the top face of the multifunction peripheral main body 2, a platen (document presser) 24 (see FIG. 1) is openably/closably arranged that presses and thereby holds a document placed on a contact glass 25 (see FIG. 2) on the image reading device 6. On the platen 24, a document transport device 27 is provided.

Figure 2:
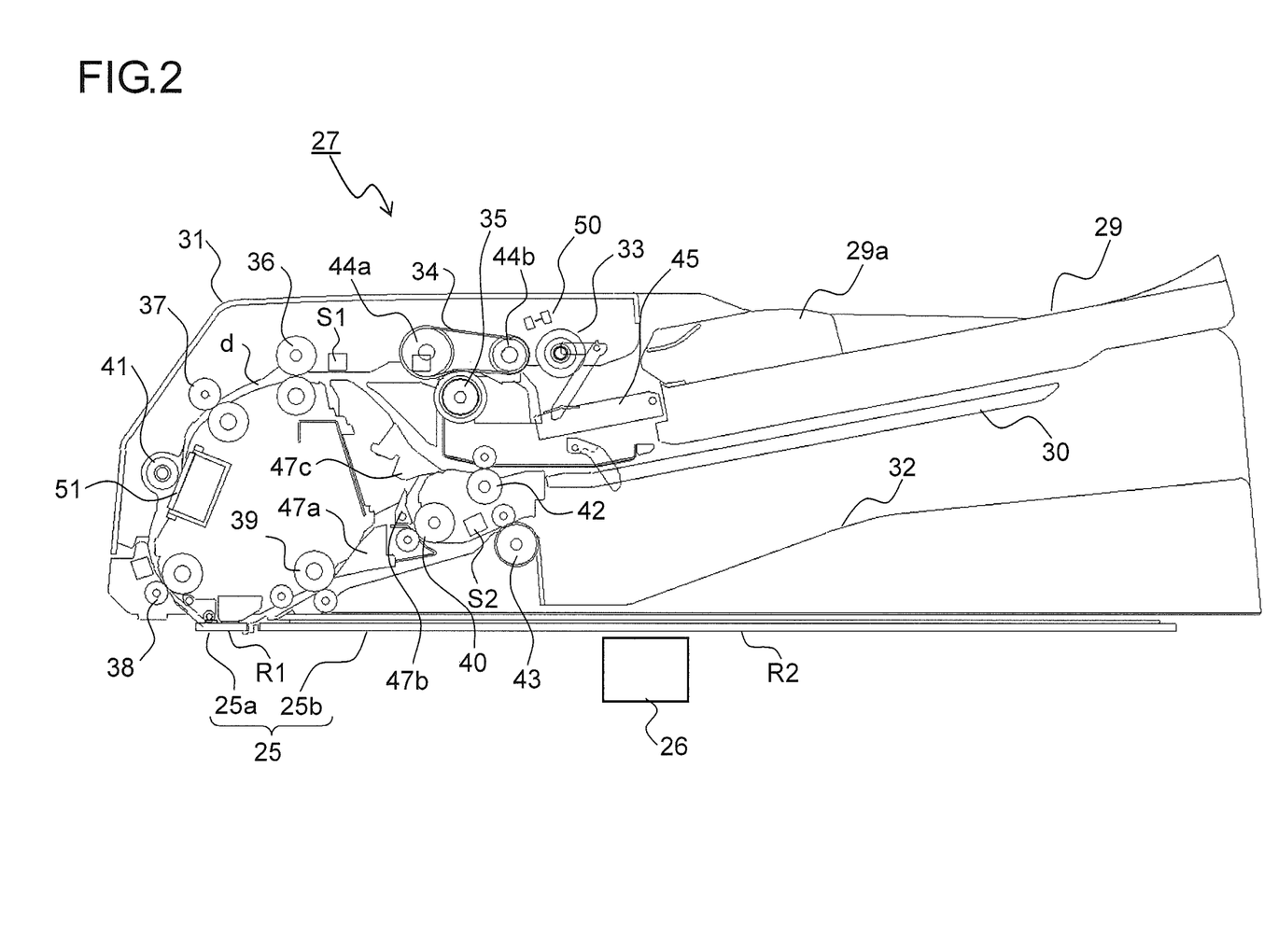
FIG. 2 is a side sectional view showing an internal structure of a document transport device 27 used in the image reading device 6 according to the present embodiment.
Figure 3:
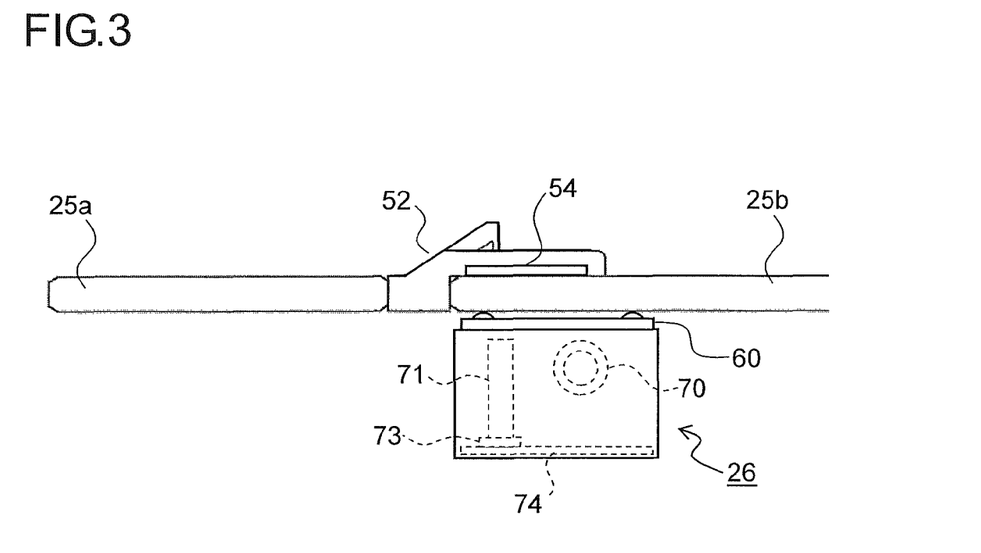
FIG. 3 is a partly enlarged view showing a structure of and around the obverse-side reading module 26 in FIG. 2.

FIG. 2 is a side sectional view showing an internal structure of the document transport device 27 used in the image reading device 6 according to the present embodiment. FIG. 3 is a partly enlarged view showing a structure of and around an obverse-side reading module 26 in FIG. 2. On the top face of the image reading device 6 is arranged the contact glass 25, which is composed of an automatic read glass 25a and a manual placement document glass 25b. Inside the image reading device 6, the obverse-side reading module 26 is arranged.

The obverse-side reading module 26 is a reading module of a CIS sensor (contact image sensor) type. Inside the obverse-side reading module 26, there are provided a light source 70, a converging lens 71 composed of a plurality of lenses, and a CMOS (complementary metal-oxide-semiconductor) sensor 73 as a reading means, such that light emitted from the light source 70 is reflected by a document (unilustrated), and is then converged by the converging lens 71 to be directed to the CMOS sensor 73. The CMOS sensor 73 is supported on a CCD (charge-coupled device) board 74. The obverse-side reading module 26 is in contact with the reverse side of the contact glass 25 via a slider 60.

The obverse-side reading module 26 reads an image of a document placed on the manual placement document glass 25b while moving in the sub-scanning direction (the left/ right direction in FIG. 2). The obverse-side reading module 26 also reads an image on the observe side of a document transported by the document transport device 27 while remaining at rest right under the automatic read glass 25a. Between the automatic read glass 25a and the manual placement document glass 25b, there is arranged a transport guide 52 that lifts up a leading end of a document transported by the document transport device 27. In a lower part of the transport guide 52, there is arranged a white reference plate 54 for shading correction of the obverse-side reading module 26.

The document transport device 27 includes a document feed tray 29 which has a document guide 29a on which a document comprising a plurality of sheets is aligned and placed, and a reverse tray 30 arranged under the document feed tray 29. The document feed tray 29 and the reverse tray 30 have their respective members fitted to a frame of the document transport device 27. A cover member 31 is openably/closably supported on the frame of the document transport device 27, with one end (the lower left end in FIG. 2) of the cover member 31 serving as a swing fulcrum. On a side of the cover member 31, there is formed a document discharge tray 32 fitted directly to a part of the top face of the platen 24. Inside the cover member 31, there is formed a document transport passage d leading from the document feed tray 29 to the document discharge tray 32, and opening the cover member 31 permits the document transport passage d to be open for jam handling.

Inside the cover member 31, there are arranged, along the document transport passage d, document transport members, which include a pickup roller 33, a sheet feed belt 34, a separation roller 35, a registration roller pair 36, transport roller pairs 37, 38, 39, and 40, a CIS roller 41 (opposite roller), a reverse roller pair 42, a discharge roller pair 43, etc. The sheet feed belt 34 is wound around a driving roller 44a and a following roller 44b, and is in contact with the separation roller 35 which is pressed with a predetermined force from below. In the separation roller 35, a torque limiter is incorporated such that the separation roller 35 rotates in the opposite direction to the sheet feed belt 34 only when a rotation load is below a predetermined torque, but that the separation roller 35 rotates by following the sheet feed belt 34 as it rotates when a rotation load is above the predetermined torque. Over the pickup roller 33, an upper surface detection sensor 50 that detects an upper surface position of a document.

The document transport passage d is curved so as to be reversed in a part thereof leading from the registration roller pair 36 to the automatic read glass 25a. In the document transport passage d, there are arranged, at appropriate places, a plurality of sheet detection sensors including a sheet feed sensor S1 and a discharge sensor S2 for detecting the presence or absence, or the passage of a document.

Now, a description will be given of how document feeding operation proceeds in a sheet through system using the document transport device 27. In the sheet through system, a document comprising a plurality of sheets is set on the document feed tray 29 with the image side up. Then, when a copy-start button on an operation panel (display means) 75 (see FIG. 1) of the image forming apparatus 100 is pressed, a lift plate 45 raised by an elevation mechanism (unillustrated) pushes up the pickup roller 33 via the document. The weight of a frame (unillustrated) including the pickup roller 33 is added to the lift plate 45, and thereby an upper surface of the document is pressed against the pickup roller 33 with a predetermined pressure (sheet feed pressure).

Here, the pickup roller 33, the driving roller 44a, the following roller 44b, and the sheet feed belt 34 are arranged on an unillustrated frame. The pickup roller 33 is coupled to the driving roller 44a by an unillustrated gear such that, as the driving roller 44a is driven to rotate by a roller driving motor (unillustrated), the sheet feed belt 34, which is wound around the driving roller 44a and the following roller 44b under a tension, is driven to rotate, and also the pickup roller 33 is driven to rotate.

Usually, a plurality of sheets in a top part of the document set on the document feed tray 29 are fed by the pickup roller 33 to a nip between the sheet feed belt 34 and the separation roller 35. Then, by the separation roller 35, only the topmost one of the plurality of sheets of the document is separated to be transported toward the registration roller pair 36. Here, after the leading end of the document is detected by the sheet feed sensor S1, the document is transported over a predetermined distance; then, when the roller driving motor stops its operation, the pickup roller 33 and the sheet feed belt 34 stop being driven to rotate; this completes primary sheet feeding. The primarily fed document is stopped with its leading end at a nip between the registration roller pair 36, causing a sag.

At the lapse of a predetermined time after the completion of the primary sheet feeding, secondary sheet feeding starts. That is, by the operation of a secondary sheet driving motor (unillustrated), the registration roller pair 36 is driven to rotate. The document is transported by the registration roller pair 36, the transport roller pairs 37 to 40, and the CIS roller 41 toward the automatic read glass 25a. The document transported to the automatic read glass 25a is, by making contact with the document presser 24 arranged opposite the automatic read glass 25a, pressed against the automatic read glass 25a from above. Then, an image on the obverse side (the side facing the automatic read glass 25a) of the document is read through the automatic read glass 25a by the obverse-side reading module 26.

Then, the document having passed over the automatic read glass 25a is transported toward the discharge roller pair 43, and is then eventually discharged by the discharge roller pair 43 onto the document discharge tray 32. Here, the discharge sensor S2 detects passage of a trailing end of the document and thereby detects completion of reading of an image on one document sheet. Here, the discharge sensor S2 has the capability of counting the number of sheets of a document each time transport of a document sheet is completed, and so long as the sheet feed sensor S1 detects a succeeding document sheet, document transport is continued for second and following sheets in the same manner as described above.

There are two ways of reading a two-sided document. According to one way, an image on the reverse side of a document is read by a reverse-side reading module 51 arranged opposite the CIS roller 41, and an image on the obverse side of the document is read through the automatic read glass 25a. This is single-stage reading. According to the other way, first, an image on the obverse side of a document is read through the automatic read glass 25a, and then the document is distributed by branch claws 47a, 47b, and 47c onto the reverse tray 30; then, with the reverse roller pair 42 rotated in the reverse direction, the document is transported, with the reverse side up, once again to the upstream side of the registration roller pair 36 so that an image on the reverse side of the document is read by the obverse-side reading module 26. This is two-stage reading.

When two-stage reading is adopted, if document sheets having been read are sequentially discharged, as they are, onto the document discharge tray 32, the discharged document sheets are placed with the obverse and reverse sides reversed with respect to those of the document set on the document feed tray 29. Thus, after an image is read on the reverse side of a document sheet by the obverse-side reading module 26, the branch claws 47a to 47c are swung so that the document sheet is transported once again onto the reverse tray 30 so as to be discharged via the transport roller pair 40 and the discharge roller pair 43 onto the document discharge tray 32. In this way, each sheet of a document has its observe and reverse sides reversed once again before being discharged, and thus it is possible to place document sheets onto the document discharge tray 32 in the same state as that of the document set on the document feed tray 29.

Figure 4:
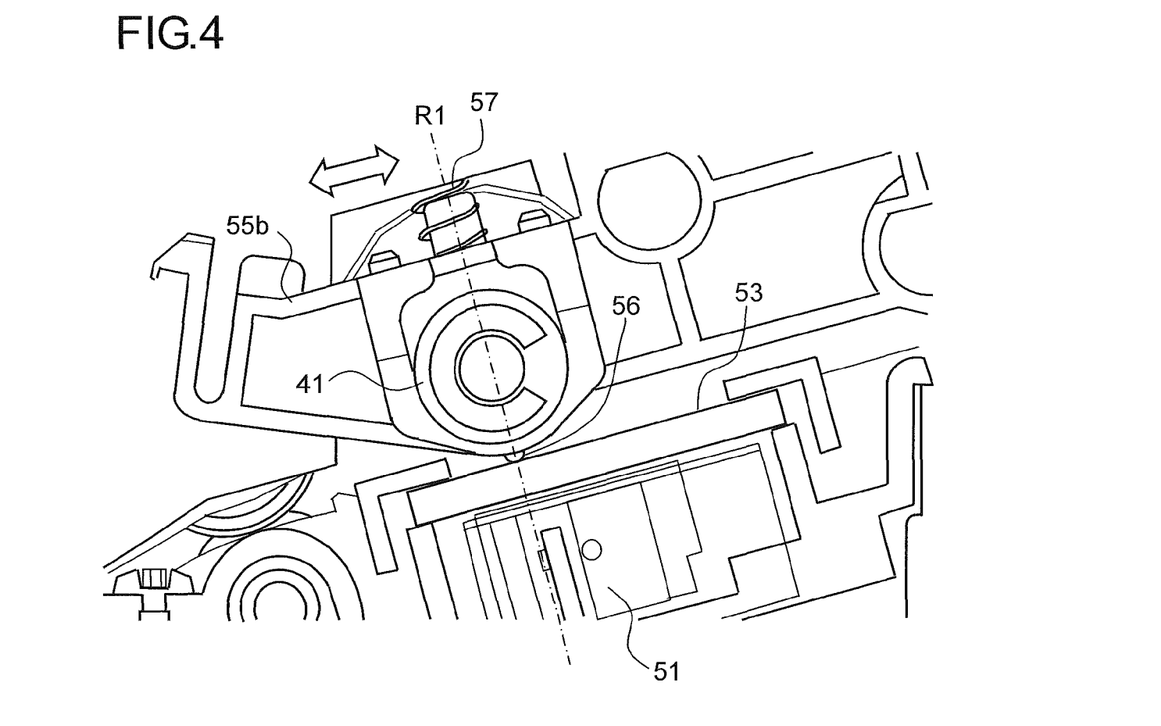
FIG. 4 is a partly enlarged view showing a structure of and around the reverse-side reading module 51 in FIG. 2.
Figure 5:
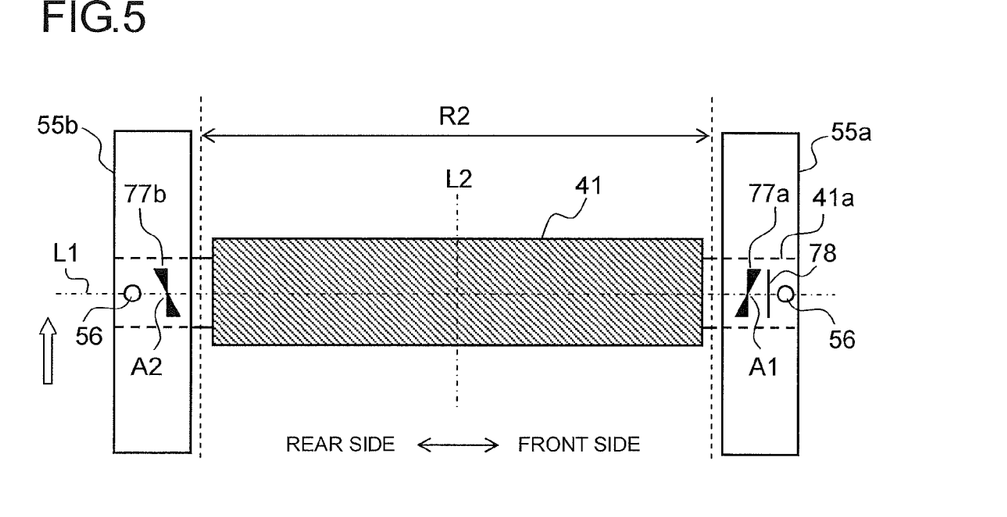
FIG. 5 is a plan view of a CIS roller 41 and roller holders 55a and 55b as seen from below in FIG. 4.
Figure 6A:
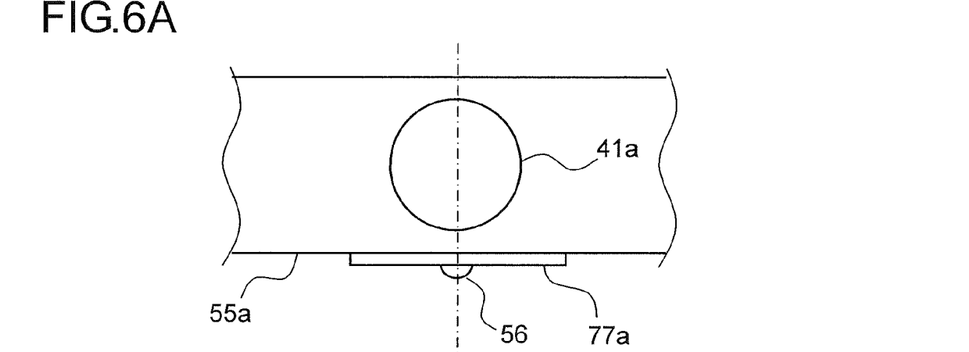
FIG. 6A is a side view of a check pattern 77a formed on the roller holder 55a on the front side of the apparatus.
Figure 6B:
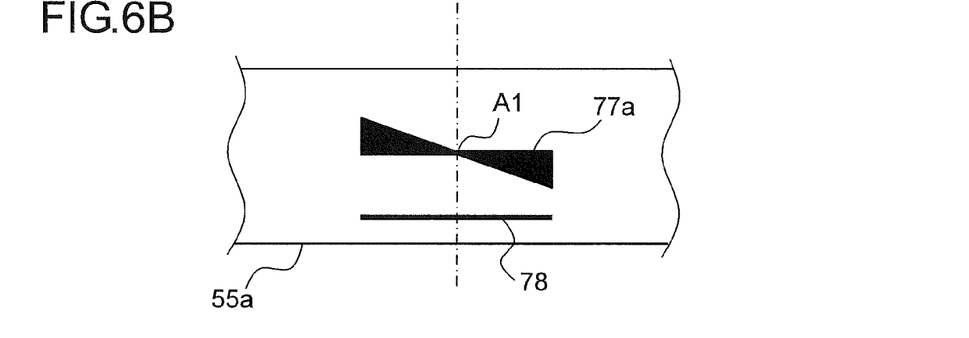
FIG. 6B is a plan view of the check pattern 77a formed on the roller holder 55a on the front side of the apparatus.

FIG. 4 is a side sectional view of and around the reverse-side reading module 51 and the CIS roller 41 in FIG. 2. FIG. 5 is a plan view of the CIS roller 41 and roller holders 55a and 55b as seen from below in FIG. 4. FIGS. 6A and 6B are a side view and a plan view, respectively, of a check pattern 77a formed on the roller holder 55a on the front side of the apparatus. FIG. 4 shows only the roller holder 55b on the rear side of the apparatus.

The reverse-side reading module 51 is a reading module of a CIS sensor (contact image sensor) type, like the obverse-side reading module 26 (see FIG. 2). Inside the reverse-side reading module 51, there are provided a light source 70, a converging lens 71 composed of a plurality of lenses, and a CMOS (complementary metal-oxide-semiconductor) sensor 73 (see FIG. 3 for all of these) as a reading means. Light emitted from the light source 70 is reflected by a document (unillustrated), and is then converged by the converging lens 71 to be directed to the CMOS sensor 73. On a face of the reverse-side reading module 51 facing the CIS roller 41, a reverse-side read glass 53 is arranged.

The CIS roller 41 is arranged, at a position where it faces the reverse-side read glass 53 from above it, along the reverse-side read glass 53 in the direction perpendicular to the document transport direction (in the direction perpendicular to the plane of FIG. 4). The CIS roller 41 forms, between itself and the reverse-side read glass 53, part of the document transport passage d. The circumferential surface of the CIS roller 41 is formed to be white in color.

The CIS roller 41 has the capabilities of transporting a document, regulating a document to prevent it from being separated from the reverse-side read glass 53, acquiring white reference data relative to the white color of the CIS roller 41 as a white reference, providing a white color as the background of a document during non-standard size document reading, and checking whether or not foreign matter such as dust is attached to the reverse-side read glass 53 from a density difference between the density of the foreign matter read as such and the density of the white color of the CIS roller 41 (and the roller holders 55a and 55b).

The roller holders 55a and 55b rotatably support opposite end parts of a rotary shaft 41a of the CIS roller 41. On faces of the roller holders 55a and 55b facing the reverse-side read glass 53, there are formed positioning protrusions 56 that are in contact with the reverse-side read glass 53. Specifically, the positioning protrusions 56 are formed, on a center line L1 of the rotary shaft 41a of the CIS roller 41, at two places outside a reading region R2 of the reverse-side reading module 51 in the front and rear directions respectively. The roller holders 55a and 55b are formed to be white in color like the CIS roller 41.

The positions of the roller holders 55a and 55b can be adjusted independently of each other in the document transport direction (the direction indicated by a white arrow in FIG. 4). One example of a mechanism for adjusting the positions of the roller holders 55a and 55b adopts a method in which oblong screw through holes (unillustrated) are formed in the roller holders 55a and 55b along the document transport direction, and, with predetermined positions of the screw through holes of the roller holders 55a and 55b located so as to overlap screw fastening holes (unillustrated) formed in the frame of the document transport device 27, fixing screws are fastened. This, however, is not meant as any limitation. Over the roller holders 55a and 55b, there is arranged a coil spring 57 that biases the roller holders 55a and 55b toward the reverse-side read glass 53.

By the positioning protrusions 56, a gap between the reverse-side read glass 53 and the CIS roller 41 is regulated to have a given distance. Thus, when a document passes over the reverse-side read glass 53, the circumferential surface of the CIS roller 41 makes contact with the surface of the document from above, and thereby regulates upward movement of the document. In this way, a document can be guided downstream while the reverse side of the document is in close contact with the reverse-side read glass 53 as described above, and thus the document can be read reliably.

To the roller holders 55a and 55b, there are attached check patterns (patterns for detection) 77a and 77b, which are, for example, colored in black. As shown in FIG. 6A, the check patterns 77a and 77b are given a smaller protrusion amount than the positioning protrusions 56 from the roller holders 55a and 55b. Thus, the roller holders 55a and 55b make point contact with the reverse-side read glass 53 via the positioning protrusions 56, and thus it is possible to stably regulate the gap between the reverse-side read glass 53 and the CIS roller 41.

The check pattern 77a is attached to the roller holder 55a arranged in a front side end part (in a right side end part in FIG. 5) of the main body of the image reading device 6; the check pattern 77b is attached to the roller holder 55b arranged in a rear side end part (in a left side end part in FIG. 5). The check patterns 77a and 77b are arranged inside a readable region (unillustrated) of the reverse-side reading module 51, but outside the reading region R2 of a document image in the front and rear directions.

The check pattern 77a has its base arranged along the transport direction (the direction indicated by a white arrow in FIG. 5), and is formed of a pair of right triangles that cross each other at the vertex (intersection A1) formed by their respective bases and oblique sides and that have their respective oblique sides arranged on opposite sides of their bases. The two right triangles are formed substantially in the same shape, and are arranged (in point symmetry) to overlap each other when rotated through 180° about the intersection A.

That is, the check pattern 77a is arranged along the transport direction, and is formed so as to have an intersection A1 in a central part of it, be increasingly wide toward the front side (here, a first end part side) downstream from the intersection A1, and be increasingly wide toward the rear side (here, a second end part side) upstream from the intersection A1. On the opposite side of the check pattern 77a from the CIS roller 41, there is formed an axial-direction reference line 78 orthogonal to a straight line L1 passing through the intersections A1 and A2.

The check pattern 77b is formed in the same shape as the check pattern 77a, and is arranged to be parallel to the transport direction, (in line symmetry) with its left and right sides reversed relative to the check pattern 77a with respect to a straight line L2 passing through a central part of the CIS roller 41 in its longitudinal direction. That is, the check pattern 77b is arranged along the transport direction, and is formed so as to have an intersection A2 in a central part of it, be increasingly wide toward the rear side (here, a first end part side) downstream from the intersection A2, and be increasingly wide toward the front side (here, a second end part side) upstream from the intersection A2.

The straight line passing through the intersections A1 and A2 of the two check patterns 77a and 77b overlaps a center line L1 of the rotary shaft 41a of the CIS roller 41. Thus, as the CIS roller 41 inclines, the check patterns 77a and 77b formed on the roller holders 55a and 55b incline together, and thus the straight line L1 also inclines simultaneously.

Figure 7:
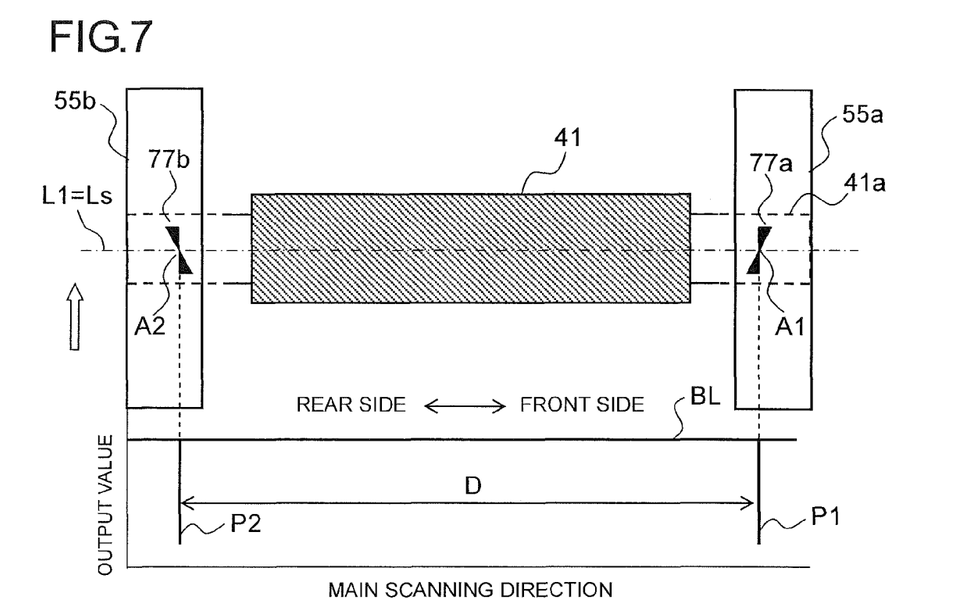
FIG. 7 is a diagram schematically showing the relationship between the inclination of the CIS roller 41 and the output value of the reverse-side reading module 51, showing a state where the CIS roller 41 is not inclined.
Figure 8:
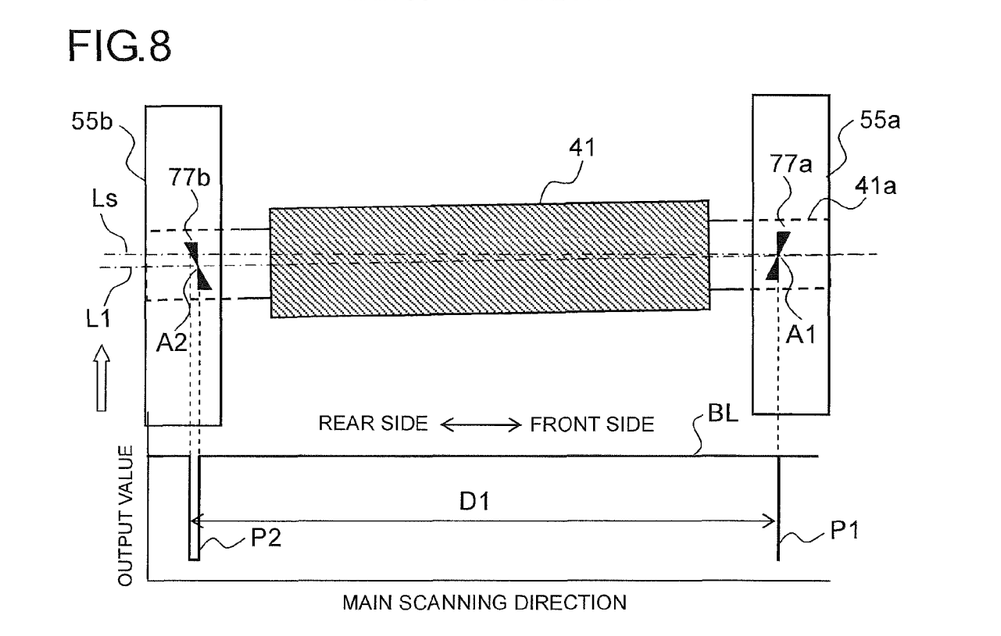
FIG. 8 is a diagram schematically showing the relationship between the inclination of the CIS roller 41 and the output value of the reverse-side reading module 51, showing a state where the CIS roller 41 is inclined in one direction.
Figure 9:
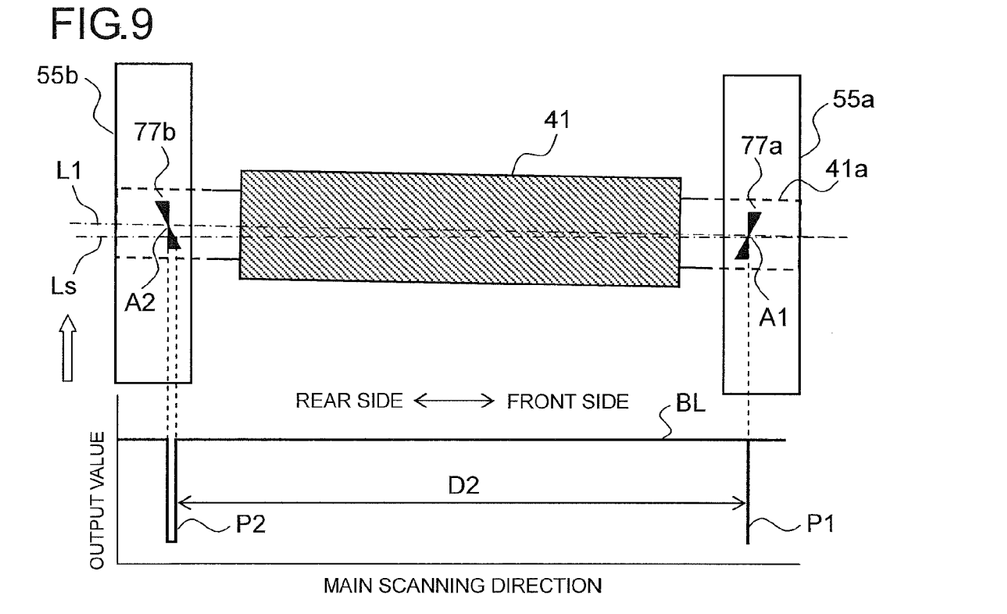
FIG. 9 is a diagram schematically showing the relationship between the inclination of the CIS roller 41 and the output value of the reverse-side reading module 51, showing a state where the CIS roller 41 is inclined in the opposite direction.

FIGS. 7 to 9 are diagrams schematically showing the relationship between the arrangement of the CIS roller 41 and the output value of the reverse-side reading module 51. FIG. 7 is a diagram showing a state where the CIS roller 41 is not inclined. FIG. 8 is a diagram showing a state where the CIS roller 41 is inclined in one direction. FIG. 9 is a diagram showing a state where the CIS roller 41 is inclined in the opposite direction. In FIGS. 7 to 9, the document transport direction is indicated by a white arrow. In FIGS. 7 to 9, no consideration is given to the peak due to the axial-direction reference line 78.

To detect an inclination of the CIS roller 41, the reverse-side reading module 51, at a reading position R1 (see FIG. 4), reads the intersections A1 and A2 of the check patterns 77a and 77b. When the CIS roller 41 is not inclined, as shown in FIG. 7, the line Ls read by the reverse-side reading module 51 overlaps the straight line L1 passing through the intersections A1 and A2.

In this case, when scanning is performed along the read line Ls, other than the circumferential surface of the CIS roller 41 and the roller holders 55a and 55b (of which all are white), only the two intersections A1 and A2 are read. Thus, in the output value of (the result of detection by) the reverse-side reading module 51, the result of reading the CIS roller 41 and the roller holders 55a and 55b is represented by a base line BL, and the intersections A1 and A2 are represented by peaks P1 and P2 in the shape of straight lines protruding downward from the base line BL. The peaks P1 and P2 appear at a given distance D from each other.

On the other hand, as shown in FIG. 8, when a rear side (the left side in FIG. 8) end part of the CIS roller 41 inclines toward the upstream side (downward in FIG. 8) with respect to the document transport direction, the intersection A2 moves downward relative to where it is in FIG. 7, and the straight line L1 inclines in the counter-clockwise direction about the intersection A1. In this case, for the check pattern 77a, the intersection A1 overlaps the read line Ls, and thus the output value of the reverse-side reading module 51 is represented by a peak P1 in the shape of a straight line as in FIG. 7.

In contrast, for the check pattern 77b, the read line Ls moves upward relative to the intersection A2, and thus crosses the part of the upper right triangle of the check pattern 77b leftward from the base (substantially corresponding to the intersection A2 with respect to the read line Ls) to the oblique side. Thus, for the check pattern 77b, the output value of the reverse-side reading module 51 protrudes, from the intersection A2 to the left side, downward from the base line BL. That is, the output value of the reverse-side reading module 51 is represented by a peak P2 in the shape of a rectangular wave whose right side passes through the intersection A2 and whose peak width equals a width corresponding to the inclination of the CIS roller 41.

Here, the rectangular wave-form peak P2 is wider toward the rear side (the left side in FIG. 8) than the straight-line peak P2 shown in FIG. 7. As a result, let the maximum distance between the peak P1 and the rectangular wave-form peak P2 be D1, then D1>D holds. As the inclination amount of the CIS roller 41 increases, the length over which the read line Ls crosses the part of the upper right triangle of the check pattern 77b increases, and accordingly, the peak width of the peak P2 increases.

As shown in FIG. 9, when a rear side (the left side in FIG. 9) end part of the CIS roller 41 inclines toward the downstream side (upward in FIG. 9) with respect to the document transport direction, the intersection A2 moves upward relative to where it is in FIG. 7, and the straight line L1 inclines in the clockwise direction about the intersection A1. In this case, for the check pattern 77a, the intersection A1 overlaps the read line Ls, and thus the output value of the reverse-side reading module 51 is represented by a peak P1 in the shape of a straight line as in FIG. 7.

In contrast, for the check pattern 77b, the read line Ls moves downward relative to the intersection A2, and thus crosses the part of the lower right triangle of the check pattern 77b rightward from the base (substantially corresponding to the intersection A2 with respect to the read line Ls) to the oblique side. Thus, for the check pattern 77b, the output value of the reverse-side reading module 51 protrudes, from the intersection A2 to the right side, downward from the base line BL. That is, the output value of the reverse-side reading module 51 is represented by a peak P2 in the shape of a rectangular wave whose left side passes through the intersection A2 and whose peak width equals a width corresponding to the inclination of the CIS roller 41.

Here, the rectangular wave-form peak P2 is wider toward the front side (the right side in FIG. 9) than the straight-line peak P2 shown in FIG. 7. As a result, let the minimum distance between the peak P1 and the rectangular wave-form peak P2 be D2, then D2<D holds. As the inclination amount of the CIS roller 41 increases, the length over which the read line Ls crosses the part of the lower right triangle of the check pattern 77b increases, and accordingly, the peak width of the peak P2 increases.

As described above, by detecting the output value of the reverse-side reading module 51 at the reading position R1, it is possible to detect the direction in which the CIS roller 41 inclines based on the peak appearing position relative to the intersection A1 (the distance between the peaks P1 and P2), and to detect the inclination amount based on the peak width of the rectangular wave-form peak P2.

Here, although, as an example, a case has been dealt with where only the rear side (the intersection A2 side) part of the CIS roller 41 inclines, even in a case where only the front side (the intersection A1 side) part thereof inclines, the inclination direction and the inclination amount of the CIS roller 41 can be detected likewise. Specifically, in that case, the peak P1 is in the shape of a rectangular wave and the peak P2 is in the shape of a straight line; thus, it is possible to detect the inclination direction of the CIS roller 41 based on the peak appearing position relative to the intersection A2 (the distance between the peaks P1 and P2), and to detect the inclination amount based on the peak width of the rectangular wave-form peak P1.

Figure 10:
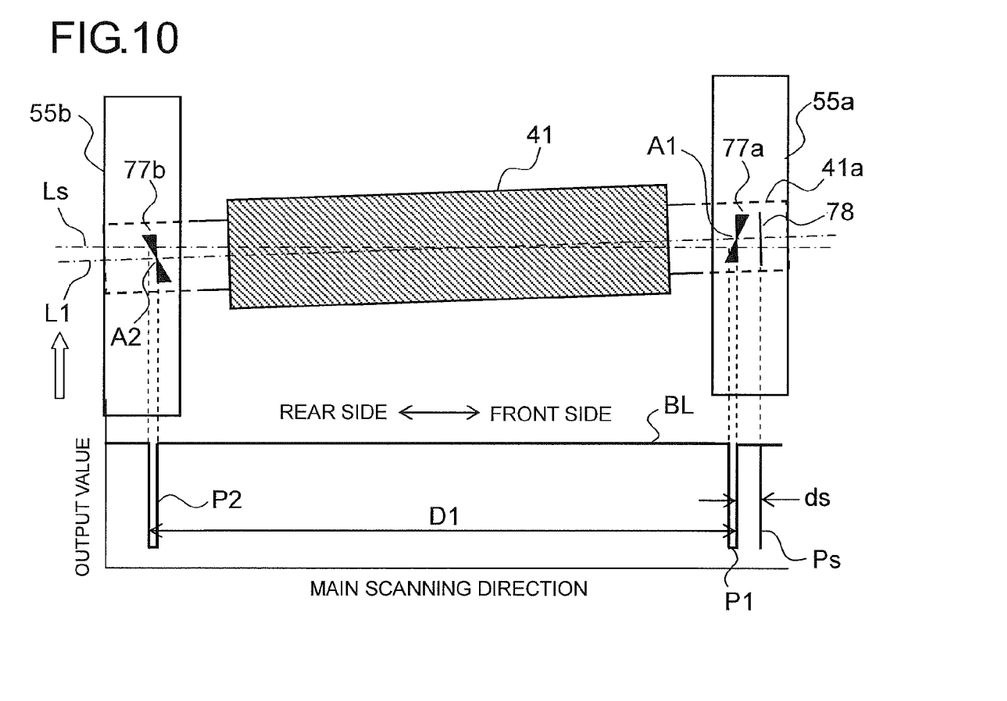
FIG. 10 is a diagram schematically showing the relationship between the inclination of the CIS roller 41 and the output value of the reverse-side reading module 51, showing a state where the front side part and the rear side part of the CIS roller 41 are inclined simultaneously.

FIG. 10 is a diagram schematically showing the relationship between the inclination of the CIS roller 41 and the output value of the reverse-side reading module 51, showing a state where the front side part and the rear side part of the CIS roller 41 are inclined simultaneously. When the front side part and the rear side part of the CIS roller 41 are inclined simultaneously, the peaks P1 and P2 both are peaks in the shape of a rectangular wave. The appearing positions of the peaks P1 and P2 vary due to variation in the fitting positions of the reverse-side reading module 51 and the roller holders 55a and 55b in the axial direction thereof (the left/right direction in FIG. 10) and the like. Thus, neither of the rectangular wave-form peaks P1 and P2 can be determined as a peak position that serves as a reference position (the peak position that passes through the intersection A1 or A2). As a result, the inclination direction of the CIS roller 41 cannot be detected.

As a solution, the axial-direction reference line 78 is previously formed in the vicinity of the check pattern 77a of the roller holder 55a so as to read the axial-direction reference line 78 together with the check patterns 77a and 77b. The output value of the axial-direction reference line 78 by the reverse-side reading module 51 is represented by a peak Ps (reference peak) in the shape of a straight line that always protrudes downward from the base line BL. The distance between the axial-direction reference line 78 and the intersection A1 of the check pattern 77a is fixed. Thus, by detecting which of the two peaks of the rectangular wave-form peak P1 has the fixed distance from the peak Ps, it is possible to determine the peak position that passes through the intersection A1. Then, when the peak position that passes through the intersection A1 is determined, the distance between the peaks P1 and P2 can be calculated based on the peak position, and thus the inclination direction of the CIS roller 41 can be detected.

For example, in FIG. 10, the distance ds between the outer (front side) peak of the two peaks of the rectangular waveform P1 and the peak Ps is fixed, and accordingly the outer (front side) peak passes through the intersection A1 and the peak P1 extends toward the rear side (the left side in FIG. 10). That is, the front part of the CIS roller 41 is inclined toward the downstream side with respect to the transport direction. The maximum distance D1 from the outer peak (the peak that passes through the intersection A1) of the peak P1 to the peak P2 is larger than the given distance D (see FIG. 7), and the peak P2 extends toward the rear side (the left side in FIG. 10). That is, the rear side part of the CIS roller 41 is inclined toward the upstream side with respect to the transport direction.

The output value (hereinafter referred to as a measured output value) of the reverse-side reading module 51 as obtained when the inclination is detected is transmitted to an unillustrated control portion, and is displayed on an operation panel 75. In an unillustrated storage, the output value of the reverse-side reading module 51 as obtained when the CIS roller 41 is not inclined as shown in FIG. 7 is previously stored as a reference output value. When the inclination is detected, the reference output value is displayed on the operation panel 75 together with the measured output value.

Then, while the reverse-side reading module 51 reads the read line Ls, the positions of the roller holders 55a and 55b are changed such that the measured output value displayed on the operation panel 75 equals the reference output value, and thereby the inclination of the CIS roller 41 can be adjusted. In this way, it is possible to adjust the inclination while visually checking the measured output value and the reference output value which are displayed on the operation panel 75; this facilitates the inclination adjustment. The control portion and the storage may be arranged in the image reading device 6 or in the image forming apparatus 100.

Here, the check patterns 77a and 77b are attached to the roller holder 55a on the front side of the apparatus and to the roller holder 55b on the rear side of the apparatus respectively, and the reverse-side reading module 51 reads the check patterns 77a and 77b to detect the inclination of the CIS roller 41. This makes it possible to detect the inclination of the CIS roller 41 more reliably. Without the check patterns 77a and 77b attached to the roller holders 55a and 55b, the reverse-side reading module 51 can still read an embossed portion and the like formed on the roller holders 55a and 55b during their molding.

Here, the check patterns 77a and 77b are arranged along the transport direction, and are so formed, with respect to the transport direction, as to have the intersections A1 and A2 in central parts of them respectively, be increasingly wide toward the front and rear sides with respect to the front/rear direction of a bottom face 73a upstream from the intersections A1 and A2 respectively, and be increasingly wide toward the rear and front sides downstream from the intersections A1 and A2 respectively. This makes it possible to detect the inclination direction and the inclination amount of the CIS roller 41 easily and reliably.

There is no particular limitation on the check patterns 77a and 77b as long as the inclination of the CIS roller 41 can be detected. For example, instead of arranging the check patterns 77a and 77b in line symmetry as described above, it is possible to arrange as the check pattern 77b one having the same shape as the check pattern 77a, or to arrange as the check pattern 77a one having the same shape as the check pattern 77b.

For another example, the check patterns 77a and 77b may be formed in the shape of a straight line inclined with respect to the transport direction, or may be formed in a rectangular shape elongate in a direction inclined with respect to the transport direction. Even in this case, by comparing the peak that appears in the measured output value with the peak of the reference output value, it is possible to detect the inclination direction and the inclination amount of the CIS roller 41.

Here, the operation panel 75 is provided on which the measured output value and the reference output value are displayed, and it is thus possible to adjust the inclination of the CIS roller 41 while checking the degree of inclination on the operation panel 75. This achieves easy and efficient inclination adjustment. As a result, the inclination can be detected more effectively.

It is not always necessary to display the measured output value and the reference output value on the operation panel 75; for example, it is possible to check the measured output value and the reference output value as they are displayed on a host device such as a personal computer, or as they are printed on a sheet stored in the sheet feeding mechanism 10. Here, although the output value of the reverse-side reading module 51 is represented by a peak, as will be described later, it may be displayed as a numerical value.

Figure 11:
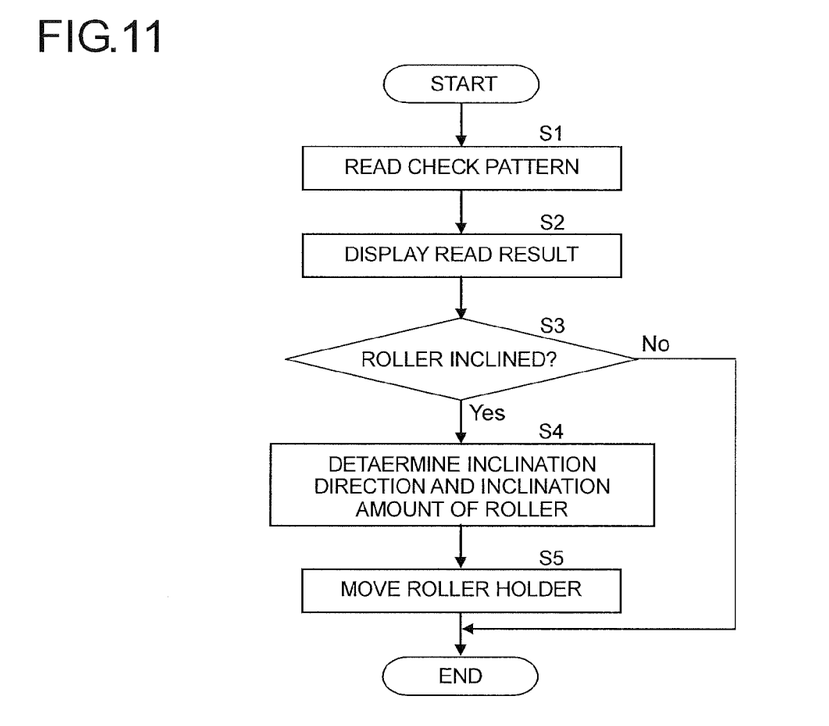
FIG. 11 is a flow chart showing a procedure for performing an inclination adjustment mode for adjusting the inclination of the CIS roller 41.

FIG. 11 is a flow chart showing a procedure for performing an inclination adjustment mode for adjusting the inclination of the CIS roller 41. Next, a description will be given of operation for adjusting the inclination of the CIS roller 41 based on the result of the inclination of the CIS roller 41 detected as described above.

When the inclination adjustment mode is selected on the operation panel 75, the reverse-side reading module 51 reads the check patterns 77a and 77b formed on the roller holders 55a and 55b along the read line Ls (step S1). Then, the output value of the reverse-side reading module 51 based on the check patterns 77a and 77b is displayed as a measured output value on the operation panel 75 (step S2). On the other hand, the above-described output value of the reverse-side reading module 51 as obtained when the CIS roller 41 is not inclined as shown in FIG. 7 is previously stored as a reference output value, and the reference output value is displayed on the operation panel 75 together with the measured output value.

An operator visually observes the measured output value and the reference output value displayed on the operation panel 75 to check whether or not the CIS roller 41 is inclined (step S3). When CIS roller 41 is not inclined (No in step S3), the inclination adjustment mode ends.

When the CIS roller 41 is inclined (Yes in step S3), the inclination direction and the inclination amount of the CIS roller 41 are determined based on the wave forms (the peaks P1 and P2) of the check patterns 77a and 77b with respect to the wave form of the axial-direction reference line 78 (the peak Ps) (step S4).

Then, while the measured output value and the reference output value displayed on the operation panel 75 are checked, the roller holders 55a and 55b are moved by their inclination amount in the transport direction (the direction indicated by a white arrow in FIG. 4) (step S5). For example, when the CIS roller 41 is inclined as shown in FIG. 8, the roller holder 55b on the rear side of the apparatus is moved by a predetermined amount toward the downstream side with respect to the transport direction.

Then, when the peak appearing position and the peak width of the measured output value displayed on the operation panel 75 equal the peak appearing position and the peak width of the reference output value, the adjustment ends. In this way, the inclination of the CIS roller 41 can be adjusted.

As described above, by adjusting the inclination of the CIS roller 41, it is possible to prevent read failure, failure to acquire white reference data, degradation in foreign matter detecting performance, etc. of the reverse-side reading module 51 due to the inclination of the CIS roller 41.

Here, the inclination of the CIS roller 41 is displayed as peak wave forms of the measured output value and the reference output value; instead, they may be displayed as numerical values. In this case, for example, the peak appearing position and the peak width of the reference output value can be previously stored in an unillustrated storage as reference numerical values. Then, as to the measured output value compared with the reference output value, the deviation (which is displayed, for example, with a plus or minus sign) of the peak appearing position and the deviation amount (which is displayed, for example, in millimeters) of the peak width can be calculated as the inclination direction and the inclination amount, respectively, by an unillustrated control portion, and these can then be displayed on the operation panel 75 or on a host device such as a personal computer. Then, an operator moves the roller holders 55 while checking the numerical values, and when the numerical values equal zero, the adjustment is completed.

Figure 12:
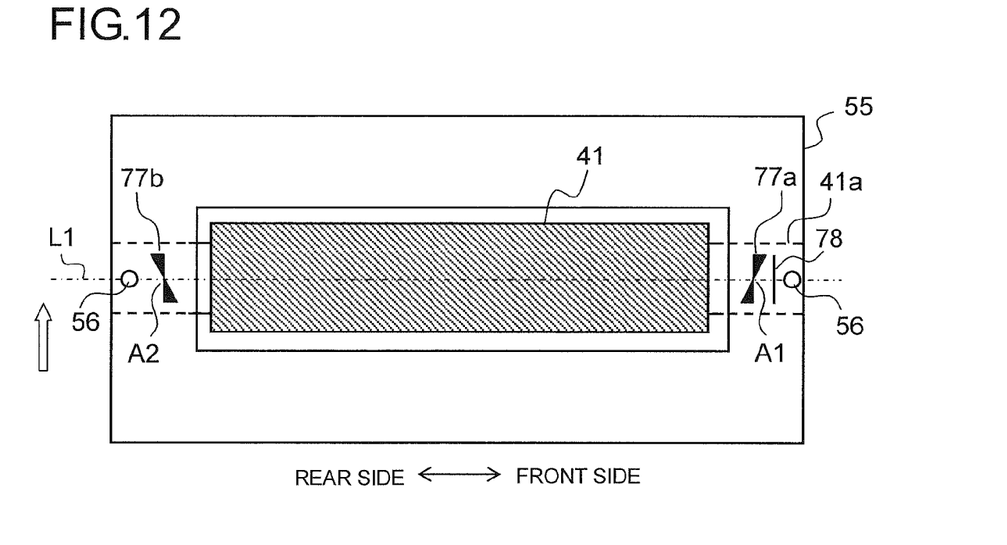
FIG. 12 is a plan view showing an example in which a frame-form roller holder 55 is used instead of the roller holders 55a and 55b in FIG. 5.

The embodiments described above are in no way meant to limit the present disclosure, which thus allows for many modifications and variations within the spirit of the present disclosure. For example, although in the above-described embodiment, there is provided a pair of roller holders 55a and 55b that supports the rotary shaft 41a of the CIS roller 41, there may be provided a frame-form roller holder 55 as shown in FIG. 12 so that the position of the roller holder 55 in the document transport direction can be adjusted separately on the front and rear sides of the apparatus.

For another example, although in the above-described embodiment, an operation panel 75 is provided in the image forming apparatus 100, and is shared between the image reading device 6 and the image forming apparatus 100, the operation panel 75 may be provided for exclusive use with the image reading device 6 alone.

The present disclosure is applicable to an image reading device adopting a sheet through system in which an image is read while a document is being transported. Based on the present disclosure, it is possible to provide an image reading device that can easily and accurately detect the inclination of a transport roller that is arranged opposite a reading module, and to provide an image forming apparatus incorporating such an image reading device.

What is claimed is:

1. An image reading device comprising:
   a contact glass which is fixed to a top face of a scanner frame and which is divided into a manual placement document glass and an automatic read glass;
   a document transport device which is openable/closable with respect to the contact glass in an up-down direction and which transports a document over a top face of the automatic read glass;
   a first reading module which is arranged under the contact glass so as to be reciprocatable in a sub-scanning direction, the first reading module being capable of reading an image on an obverse side of a document placed on the manual placement document glass while moving in the sub-scanning direction and capable of reading an image on an obverse side of a document transported over the top face of the automatic read glass while remaining at rest at a reading position facing the automatic read glass;
   a second reading module which is arranged inside the document transport device, the second reading module being capable of reading an image on a reverse side of the document transported over the top face of the automatic read glass;
   an opposite roller which is arranged opposite an image reading surface of the second reading module and which transports the document while keeping the document in close contact with the image reading surface; and
   roller holders which rotatably support opposite end parts of a rotary shaft of the opposite roller,
   wherein
   on faces of the roller holders facing the second reading module, a pair of patterns for detection is provided that is formed, inside a readable region of the second reading module, but outside a reading region of a document image, on the opposite end parts of the the rotary shaft of the opposite roller in an axial direction thereof perpendicular to a document transport direction,
   the patterns for detection are each formed so as to have an intersection in a central part thereof with respect to the document transport direction, be increasingly wide toward a first end side in the axial direction upstream from the intersection with respect to the document transport direction, and be increasingly wide toward a second end side which is opposite from the first end side downward from the intersection with respect to the document transport direction,
   the second reading module reads the patterns for detection to detect an inclination of the opposite roller,
   close to at least one of the pair of patterns for detection, an axial-direction reference line orthogonal to the axial direction is formed,
   the second reading module simultaneously reads the pair of patterns for detection and the axial-direction reference line to detect an inclination direction and an inclination amount of the opposite roller, and the inclination direction of the opposite roller is detected based on a distance, in the axial direction, between a reference peak that is output as a result of the second reading module reading the axial-direction reference line and two peaks that are output as a result of the second reading module reading the pair of the patterns for detection.

2. The image reading device of claim 1, wherein the inclination amount of the opposite roller is detected based on a width of a peak in a shape of a rectangular wave that is output as a result of the second reading module reading the pair of the patterns for detection.

3. An image forming apparatus comprising the image reading device of claim 1.

4. An image reading device comprising:
a contact glass which is fixed to a top face of a scanner frame and which is divided into a manual placement document glass and an automatic read glass;
a document transport device which is openable/closable with respect to the contact glass in an up-down direction and which transports a document over a top face of the automatic read glass;
a first reading module which is arranged under the contact glass so as to be reciprocatable in a sub-scanning direction, the first reading module being capable of reading an image on an obverse side of a document placed on the manual placement document glass while moving in the sub-scanning direction and capable of reading an image on an obverse side of a document transported over the top face of the automatic read glass while remaining at rest at a reading position facing the automatic read glass;
a second reading module which is arranged inside the document transport device, the second reading module being capable of reading an image on a reverse side of the document transported over the top face of the automatic read glass;
an opposite roller which is arranged opposite an image reading surface of the second reading module and which transports the document while keeping the document in close contact with the image reading surface; and
roller holders which rotatably support opposite end parts of a rotary shaft of the opposite roller,
wherein
on faces of the roller holders facing the second reading module, a pair of patterns for detection is provided that is formed, inside a readable region of the second reading module, but outside a reading region of a document image, on the opposite end parts of the rotary shaft of the opposite roller in an axial direction thereof perpendicular to a document transport direction,
the patterns for detection are each formed so as to have an intersection in a central part thereof with respect to the document transport direction, be increasingly wide toward a first end side in the axial direction upstream from the intersection with respect to the document transport direction, and be increasingly wide toward a second end side which is opposite from the first end side downward from the intersection with respect to the document transport direction,
the second reading module reads the patterns for detection to detect an inclination of the opposite roller,
on the faces of the roller holders facing the second reading module, a pair of positioning protrusions is provided that is formed on a straight line passing through a center of an axis of the opposite roller and that regulates a gap between the opposite roller and the image reading surface of the second reading module by staying in contact with the image reading surface, and
the positioning protrusions protrude toward the second reading module beyond the patterns for detection.

5. The image reading device of claim 1, further comprising:
a display means to display a result of reading the patterns for detection by the second reading module.

6. The image reading device of claim 1, wherein the second reading module is a contact image sensor.

7. The image reading device of claim 4, wherein close to at least one of the pair of patterns for detection, an axial-direction reference line orthogonal to the axial direction is formed, and
the second reading module simultaneously reads the pair of patterns for detection and the axial-direction reference line to detect an inclination direction and an inclination amount of the opposite roller.

8. The image reading device of claim 7, wherein the inclination amount of the opposite roller is detected based on a width of a peak in a shape of a rectangular wave that is output as a result of the second reading module reading the pair of the patterns for detection.

9. The image reading device of claim 4, further comprising:
a display means to display a result of reading the patterns for detection by the second reading module.

10. The image reading device of claim 4, wherein the second reading module is a contact image sensor.

11. An image forming apparatus comprising the image reading device of claim 4.

12. The image reading device of claim 11, wherein the inclination amount of the opposite roller is detected based on a width of a peak in a shape of a rectangular wave that is output as a result of the second reading module reading the pair of the patterns for detection.

13. An image reading device comprising:
a contact glass which is fixed to a top face of a scanner frame and which is divided into a manual placement document glass and an automatic read glass;
a document transport device which is openable/closable with respect to the contact glass in an up-down direction and which transports a document over a top face of the automatic read glass;
a first reading module which is arranged under the contact glass so as to be reciprocatable in a sub-scanning direction, the first reading module being capable of reading an image on an obverse side of a document placed on the manual placement document glass while moving in the sub-scanning direction and capable of reading an image on an obverse side of a document transported over the top face of the automatic read glass while remaining at rest at a reading position facing the automatic read glass;
a second reading module which is arranged inside the document transport device, the second reading module being capable of reading an image on a reverse side of the document transported over the top face of the automatic read glass;
an opposite roller which is arranged opposite an image reading surface of the second reading module and which transports the document while keeping the document in close contact with the image reading surface; and
roller holders which rotatably support opposite end parts of a rotary shaft of the opposite roller, wherein on faces of the roller holders facing the second reading module, a pair of patterns for detection is provided that is formed, inside a readable region of the second reading module, but outside a reading region of a document image, on the opposite end parts of the rotary shaft of the opposite roller in an axial direction thereof perpendicular to a document transport direction, the patterns for detection are each formed so as to have an intersection in a central part thereof with respect to the document transport direction, be increasingly wide toward a first end side in the axial direction upstream from the intersection with respect to the document transport direction, and be increasingly wide toward a second end side which is opposite from the first end side downward from the intersection with respect to the document transport direction, the second reading module reads the patterns for detection to detect an inclination of the opposite roller, and the image reading device can perform an inclination adjustment mode comprising:

reading the patterns for detection;

displaying an output value of the second reading module as obtained when the patterns for detection are read as a measured output value, and displaying an output value of the second reading module as obtained when the opposite roller is not inclined as a reference output value; and moving the roller holders based on an inclination direction and an inclination amount of the opposite roller that are calculated based on the measured output value and the reference output value that are displayed.

14. The image reading device of claim 13, wherein close to at least one of the pair of patterns for detection, an axial-direction reference line orthogonal to the axial direction is formed, and the second reading module simultaneously reads the pair of patterns for detection and the axial-direction reference line to detect an inclination direction and an inclination amount of the opposite roller.

15. The image reading device of claim 13, further comprising:

a display means is provided to display a result of reading the patterns for detection by the second reading module.

16. The image reading device of claim 13, wherein the second reading module is a contact image sensor.

17. An image forming apparatus comprising the image reading device of claim 13.

* * * * *